(12) United States Patent
Aggarwal

(10) Patent No.: US 8,386,718 B2
(45) Date of Patent: Feb. 26, 2013

(54) METHOD AND APPARATUS FOR MANAGING APPLICATION DATA IN A SHARED CACHE OF A MOBILE ELECTRONIC DEVICE

(75) Inventor: Ankur Aggarwal, Redwood City, TX (US)

(73) Assignee: Research In Motion Limited (CA)

( * ) Notice: Subject to any disclaimer, the term of this patent is extended or adjusted under 35 U.S.C. 154(b) by 521 days.

(21) Appl. No.: 12/621,125

(22) Filed: Nov. 18, 2009

(65) Prior Publication Data
US 2011/0119447 A1    May 19, 2011
US 2012/0011322 A2    Jan. 12, 2012

(51) Int. Cl.
*G06F 12/00*    (2006.01)
(52) U.S. Cl. ......... 711/144; 711/130; 711/138; 711/139
(58) Field of Classification Search .................. 711/138, 711/139, 144, 130
See application file for complete search history.

(56) References Cited

U.S. PATENT DOCUMENTS

| | | | | |
|---|---|---|---|---|
| 5,025,365 | A * | 6/1991 | Mathur et al. | 711/121 |
| 6,073,173 | A | 6/2000 | Bittinger | |
| 2002/0156979 | A1* | 10/2002 | Rodriguez | 711/129 |
| 2003/0177226 | A1* | 9/2003 | Garg et al. | 709/224 |
| 2006/0069742 | A1* | 3/2006 | Segre | 709/217 |
| 2006/0155725 | A1 | 7/2006 | Foster et al. | |
| 2008/0005087 | A1* | 1/2008 | Sato et al. | 707/3 |

FOREIGN PATENT DOCUMENTS
WO     2007118890 A1    10/2007

OTHER PUBLICATIONS

Cache it! Solve PHP Performance Problems Article >> Site Point, Ben Dechrau, Nov. 7, 2007, http://www.sitepoint.com/caching-php-performance/.*
European Search Report received in EPO9 17 6406 dated May 14, 2010.
European Examination Report dated Jan. 26, 2011; EP Application No. 09176406.8.

\* cited by examiner

*Primary Examiner* — Hong Kim
(74) *Attorney, Agent, or Firm* — Schwegman Lundberg Woessner P.A.

(57) ABSTRACT

According to embodiments described in the specification, a method and apparatus for managing memory in a mobile electronic device are provided. The method comprises: receiving a request to install an application; receiving at least one indication of data intended to be maintained in a shared cache; determining, based on the at least one indication, whether data corresponding to the intended data exists in the shared cache; upon a negative determination, writing the intended data to the shared cache; and repeating the receiving at least one indication, the determining and the writing for at least one additional application.

17 Claims, 6 Drawing Sheets

METHOD AND APPARATUS FOR MANAGING APPLICATION DATA IN A SHARED CACHE OF A MOBILE ELECTRONIC DEVICE

FIELD

The specification relates generally to mobile electronic devices, and specifically to a method and apparatus for managing memory in a mobile electronic device.

BACKGROUND

While the capabilities of mobile electronic devices such as cellular telephones and smart telephones continue to increase in terms of computational power, storage space and the like, the usage of such devices is also becoming more widespread. Greater numbers of more varied users can result in demands for improved functionality being placed on mobile electronic devices. This demand can outpace the improving technical attributes of such devices. As a result, there remains a need for frugal use of mobile electronic devices' resources.

BRIEF DESCRIPTIONS OF THE DRAWINGS

Embodiments are described with reference to the following figures, in which.

DETAILED DESCRIPTION OF THE EMBODIMENTS

An aspect of the specification can provide a method for managing memory in a mobile electronic device, the method comprising: receiving a request to install an application; receiving at least one indication of data intended to be maintained in a shared cache; determining, based on the at least one indication, whether data corresponding to the intended data exists in the shared cache; upon a negative determination, writing the intended data to the shared cache; and repeating the receiving at least one indication, the determining and the writing for at least one additional application. A computer readable storage medium for storing computer readable instructions for execution by a processor, the computer readable instructions implementing the method can also be provided.

Another aspect of the specification can provide a mobile electronic device comprising: a memory for maintaining a shared cache; a processor interconnected with the memory, the processor configure to receive a request to install an application; the processor further configured to receive at least one indication of data intended to be maintained in the shared cache; the processor further configured to determine, based on the at least one indication, whether data corresponding to the intended data exists in the shared cache maintained within the memory; the processor further configured to write, upon a negative determination, the intended data to the shared cache; and to repeat the receiving at least one indication, the determination and the writing for at least one additional application.

Figure 1:
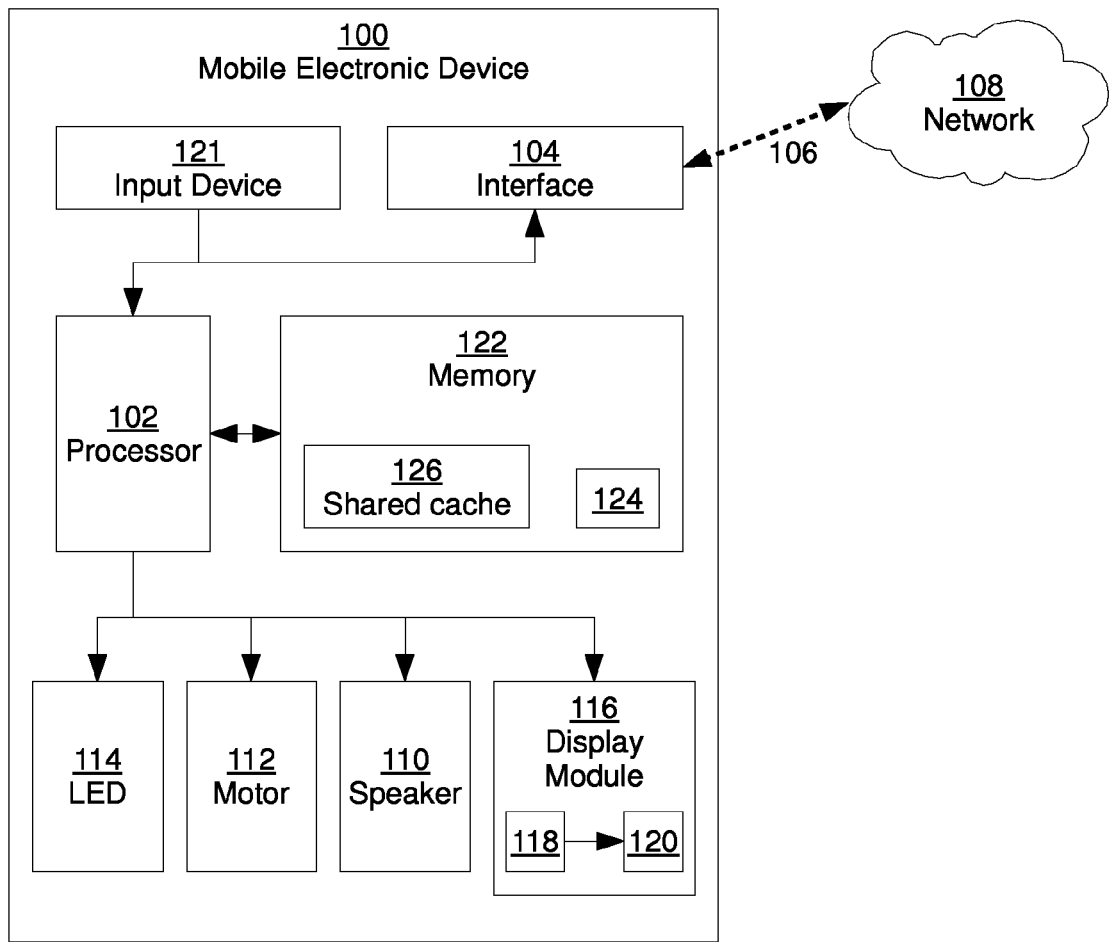
FIG. 1 depicts a schematic representation of a mobile electronic device, according to a non-limiting embodiment.

FIG. 1 depicts a mobile electronic device 100. Mobile electronic device 100 can be based on the computing environment and functionality of a hand-held wireless communication device. It will be understood, however, that mobile electronic device 100 is not limited to a hand-held wireless communication device. Other electronic devices can be used, such as cellular telephones, smart telephones, media players and laptop computers. Mobile electronic device 100 can include a processor 102 interconnected with an interface 104 by way of a communication bus (not shown). Interface 104 provides wireless or wired communication capabilities, or both wireless and wired communication capabilities, to mobile electronic device 100, by way of a link 106 connecting mobile electronic device 100 to a network 108. In the case of wireless communication, link 106 can be a wireless link based on core mobile network infrastructure (e.g. Global System for Mobile communications ("GSM"); Code Division Multiple Access ("CDMA"); CDMA 2000; 3G; 4G). Link 106 can also be based on wireless local area network ("WLAN") infrastructures such as the Institute for Electrical and Electronic Engineers ("IEEE") 802.11 Standard (and its variants), Bluetooth or the like, or hybrids thereof.

Mobile electronic device 100 can also include one or more output devices such as a speaker 110, a motor 112 and a light emitting diode ("LED") 114. Speaker 110, motor 112 and LED 114 are interconnected with processor 102 over a communication bus (not shown), and can be operable to generate notification signals. For example, speaker 110 can generate an audible notification signal, such as a ring-tone; motor 112 can generate a tactile notification signal by causing mobile electronic device 100 to vibrate; and LED 114 can generate a visual notification signal, for example by flashing on and off.

Mobile electronic device 100 can include a further output device in the form of a display module 116 interconnected with processor 102 via a communication bus (not shown). Display module 116 comprises circuitry 118 for generating a representation 120, for example of data maintained on mobile electronic device 100. It will now be apparent to those skilled in the art that display module 116 can include a flat panel display (e.g. liquid crystal display ("LCD"), plasma, and the like), a cathode ray tube ("CRT"), and the like.

Mobile electronic device 100 can also include an input device 121 interconnected with processor 102 via a communication bus (not shown). Input device 121 can comprise any suitable input device for accepting input data. For example, input device 121 can include button(s), a keypad, a track ball, a scroll wheel and any combination thereof. Input device 121 can also comprise other suitable devices that will occur to those skilled in the art. As a further example, input device 121 can include a touch screen integrated with display module 116.

Mobile electronic device 100 can also include a memory 122 interconnected with processor 102 via a communication bus (not shown). Memory 122 can be read only memory ("ROM"), Electrically Eraseable Programmable Read Only Memory ("EEPROM"), flash memory, or Random Access Memory ("RAM"). It will be appreciated that memory 122 can also be any combination or hybrid of the above-mentioned types of memory. Memory 122 can maintain plurality of applications, indicated generically at 124. Applications 124 can comprise computer readable instructions for execution by processor 102 to implement any of a wide variety of functionalities on mobile electronic device 100. It will be understood that while applications 124 are shown as being maintained in memory 122, applications 124 can be stored on any computer readable medium. Examples of such a computer readable medium include memory 122, a removable diskette, CD-ROM, ROM, fixed disk, USB drive and the like. The computer readable medium can also be located remotely to mobile electronic device 100 and the instructions can be transmitted to processor 102 via network 108, link 106 and interface 104.

Applications 124 can thus be processed, or executed, by processor 102 which makes appropriate use of memory 122 as necessary during such execution. It will be understood that memory 122 can maintain any number of applications 124. For example, memory 122 can maintain one or more email applications, one or more contacts applications, one or more social networking applications, web browsers and the like. In general, processor 102 can be configured, via execution of applications 124, to cause mobile electronic device 100 to carry out a variety of actions that will occur to those skilled in the art (e.g. sending email, uploading and downloading web content and the like).

Figure 2:
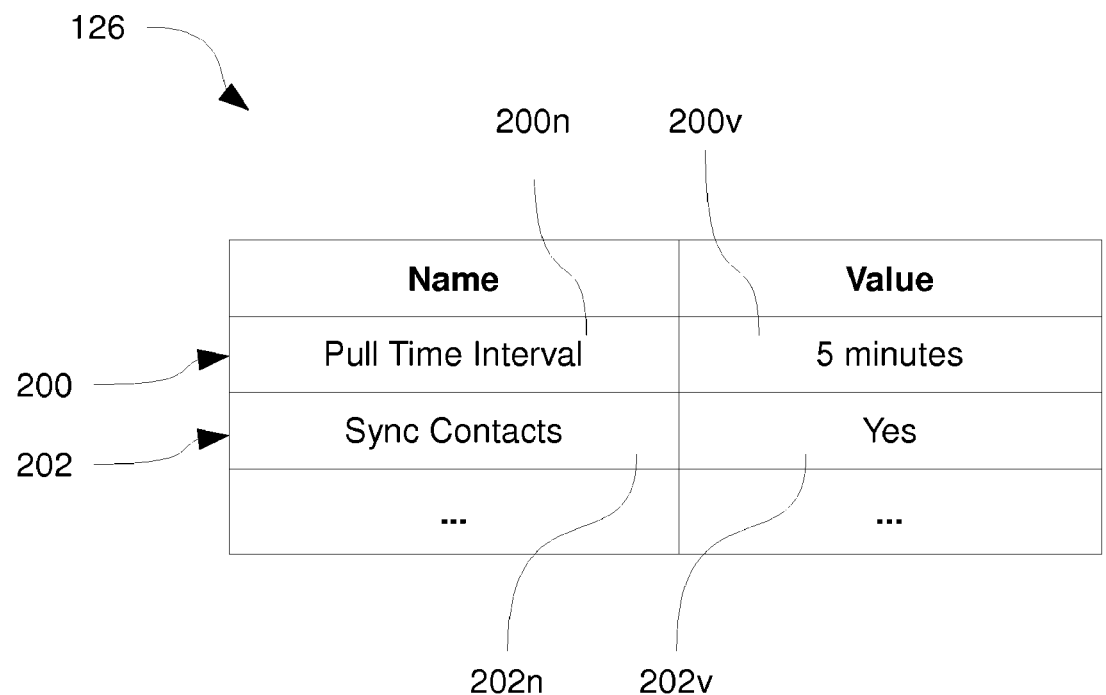
FIG. 2 depicts a shared cache maintained by the mobile electronic device of FIG. 1, according to a non-limiting embodiment.

Memory 122 can also maintain a shared cache 126. Shared cache 126 can comprise a reserved address space. Shared cache 126 can also comprise a reserved amount of storage space (i.e. not confined to any particular address space). The reserved amount can change as data is added to shared cache 126. Shared cache 126 can contain data defining settings and content for use by processor 102 during execution of applications 124. Turning to FIG. 2, an exemplary shared cache 126 is shown. Shared cache 126 can contain data 200 and 202. Data 200 and data 202 can be name-value pairs as shown in FIG. 2. It will now be apparent to those skilled in the art that while shared cache 126 is depicted in a tabular format in FIG. 2, this format is for illustrative purposes and is not strictly necessary. It will also be apparent that shared cache 126 need not include the data "Name-Value" as shown in the header row of FIG. 2. This header row is provided purely for illustrative purposes.

Each name-value pair includes a name and an associated value. For example, data 200 comprises a name 200n, "Pull Time Interval" and a value 200v, "5 minutes." Data 200 thus defines a setting named "pull time interval" maintained in shared cache 126. Such a setting can be read from memory 122 by processor 102 via execution of an application 124. For example, processor 102 can be configured via execution of an email application to regularly request new emails from a server (not shown) via link 106 and network 108. Processor 102 can be configured, via execution of the email application, to read data 200 and thereby cause mobile electronic device 100 to request new emails from the server once every five minutes.

As a further example, data 202 defines another setting, comprising a name 202n and a value 202v, named "Sync Contacts." Processor 102 can be configured, via execution of a social networking application for example, to synchronize locally-stored contacts (not shown) maintained in memory 122 with contacts maintained in a server (not shown) associated with the social networking application. Processor 102 can further be configured, via execution of the social networking application, to read data 202 and thereby cause mobile electronic device to synchronize locally-stored contacts with contacts stored on the server, or to not synchronize contacts (in other words, value 202v in the present example can take values of "Yes" or "No").

It will now be apparent to those skilled in the art that processor 102 can be configured to access the contents of shared cache 126 during execution of a variety of applications. For example, the social networking application mentioned above can further configure processor 102 to regularly request new messages or other data maintained in the social networking server. In such an exemplary situation, processor 102 can be configured to read data 200 during execution of the social networking application as well as data 202. That is, data 200 (as well as any other data contained in shared cache 126) can affect the actions of processor 102 and by extension mobile device 100 during execution of any of a plurality of different applications 124.

When a new application 124 is installed on mobile device 100—that is, newly stored in memory 122 for present or later execution by processor 102—memory 122 and particularly shared cache 126 can be managed to provide the data required by the new application 124, as will be discussed in greater detail below with reference to FIG. 3.

Figure 3:
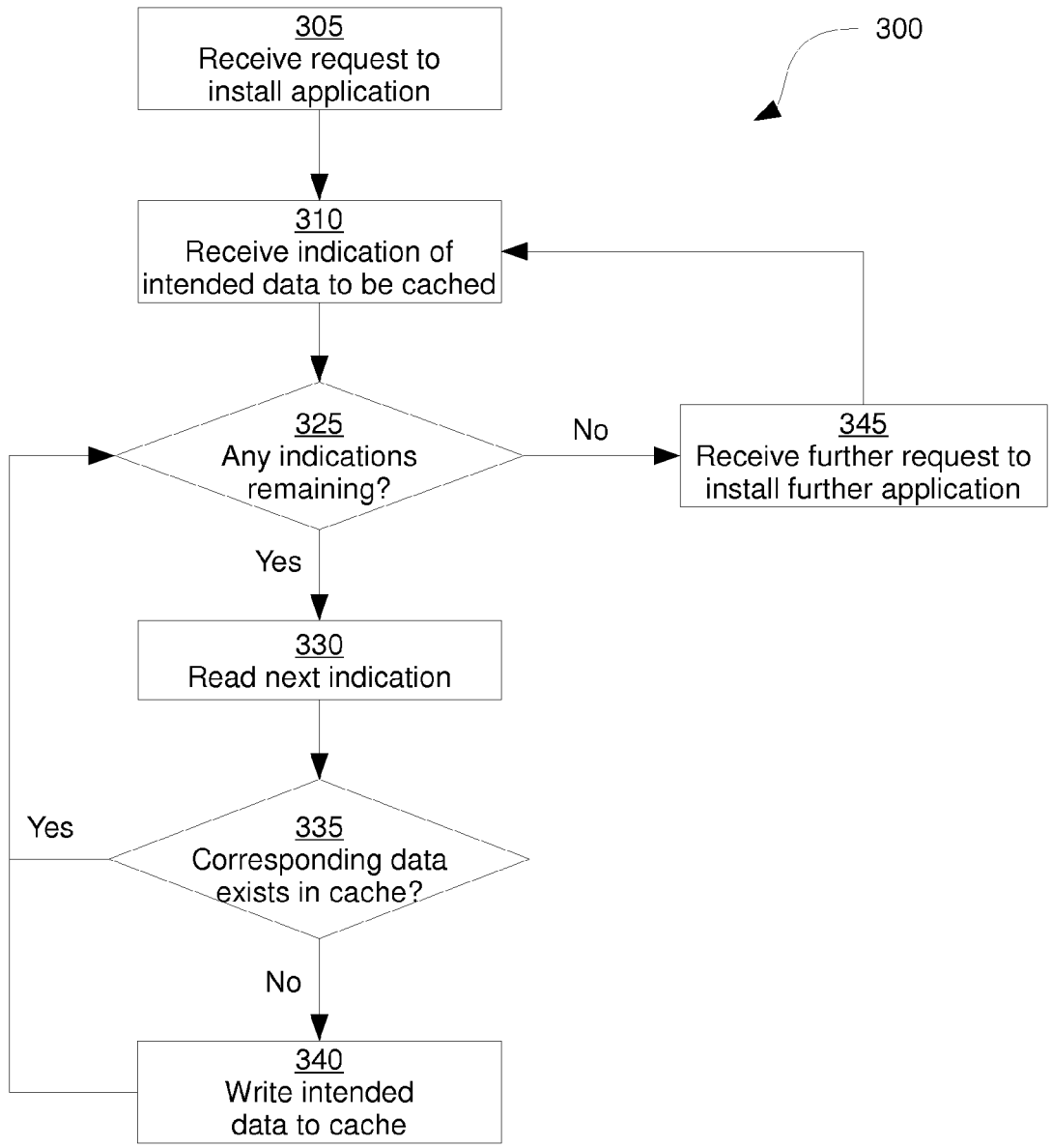
FIG. 3 depicts a method for managing memory in a mobile electronic device, according to a non-limiting embodiment.

FIG. 3 depicts a flowchart of a method 300 for managing memory in a mobile electronic device. Method 300 will be described in conjunction with its performance on mobile electronic device 100, though it will be understood that neither mobile electronic device 100 nor method 300 need be exactly as shown. For example, the blocks of method 300 need not appear in exactly the order shown in FIG. 3.

Beginning at block 305, mobile electronic device 100 receives a request to install an application 124 at processor 102. For example, the request can be received from input device 121 or from a remote computing device (not shown) via network 108, link 106 and interface 104.

Proceeding to block 310, mobile electronic device 100 receives at least one indication of data intended to be maintained in shared cache 126 for use by the new application 124. Such an indication can be received at processor 102 during installation of the application 124. In general, the at least one indication can be a representation of data required by the application 124 that can be used in the remainder of method 300 to manage shared cache 126. In some embodiments, the intended data (that is, data to be maintained in shared cache 126 for use by processor 102 during execution of the new application 124, following its installation) can comprise at least one name-value pair as described above in connection with FIG. 2. Further, the at least one indication for a given name-value pair can be the name from that name-value pair. Thus, during the installation of application 124 processor 102 can receive at least one name from at least one name-value pair intended to be maintained in shared cache 126.

Method 300 then proceeds to block 325, where processor 102 can be configured to determine whether any indications remain to be processed. It will now be apparent that a plurality of indications can be received during the installation of application 124. That is, application 124 can require that a plurality of items of data—for example, name-value pairs—be maintained in shared cache 126 for use during the execution of application 124.

If the determination at block 325 is affirmative, method 300 proceeds to block 330, where the next un-processed indication is read by processor 102. Method 300 then proceeds to block 335, where processor 102 can be configured to determine, based on the indication from block 330, whether data exists in shared cache 126 corresponding to the intended data required by application 124. In some embodiments, processor 102 can thus be configured to assess whether shared cache 126 contains a name-value pair with a name corresponding (that is, equal to) to the intended name read at block 330.

In the present exemplary performance of method 300, it will be assumed that the first indication read at block 330 is the intended name "Sync Contacts." The determination at block 335 is therefore affirmative, as shared cache 126 does contain a name-value pair with a corresponding name. Method 300 therefore returns to block 325.

Following another affirmative determination at block 325 (meaning that another indication remains to be processed during the installation of application 124) method 300 proceeds again to blocks 330 and 335. It will be assumed that the next indication read at block 330 is the intended name "Push Notification." For this indication, the determination at block 335 will be negative, as "Push Notification" does not appear in shared cache 126, as shown in FIG. 2. Method 300 then proceeds to block 340.

Figure 4:
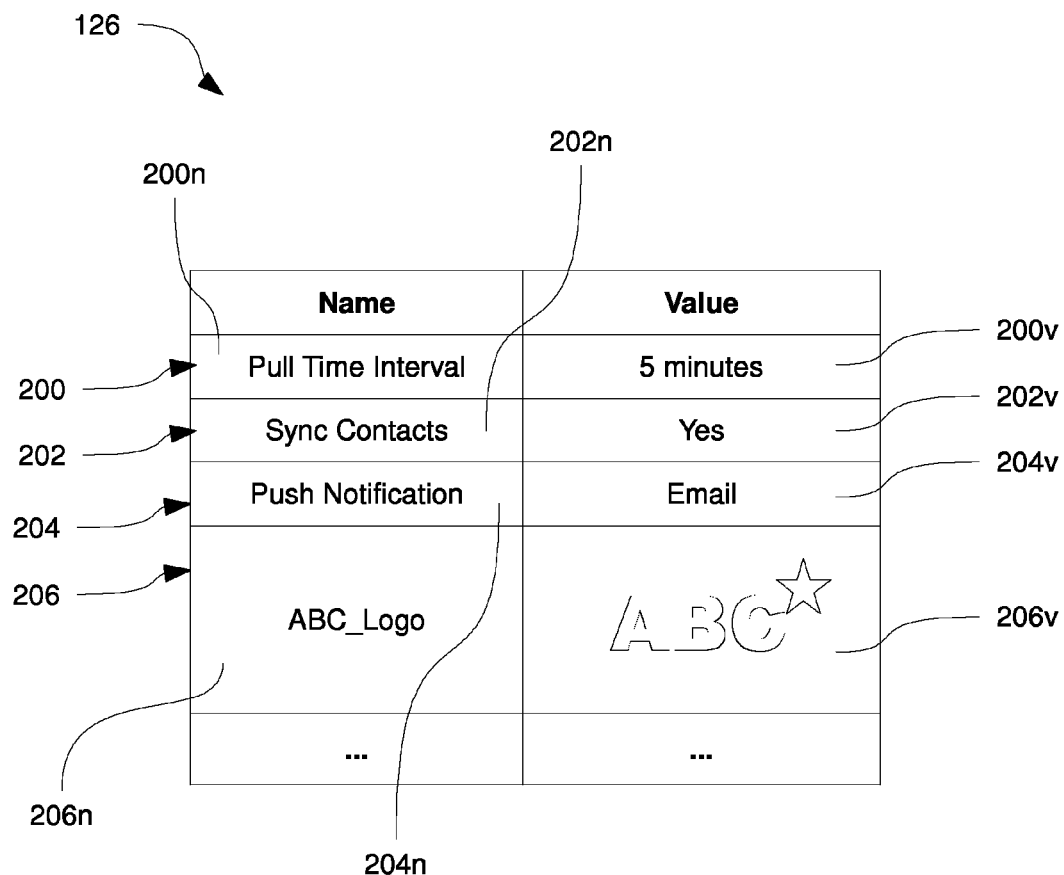
FIG. 4 depicts the shared cache of FIG. 2 following performance of the method of FIG. 3, according to a non-limiting embodiment.

At block 340, processor 102 can be configured to write the intended data to the shared cache 126. The results of a performance of block 340 can be seen in FIG. 4, where additional data 206 comprising a name 206n "Push Notification" and a value 206v "Email" has been added to shared cache 126. Data 206 can thus define a setting which determines the desired method of notification for push notifications resulting from the execution of application 124.

Following the performance of block 340, method 300 returns to block 325. Referring again to FIG. 4, the results of another affirmative determination at block 325, followed by another negative determination at block 335, are shown. Further data 206 has been added to shared cache 126, comprising a name 206n "ABC_Logo" and a value 206v. Value 206v can be an image file. For example, value 206v can be the logo of an entity associated with application 124. The logo can be displayed in a representation 120 generated by display module 116 during execution of application 124. It will now be apparent that various types of data can be stored as values in shared cache 126. For example, textual and numeral values can be stored, as well as images, videos, sound files and the like.

In the present exemplary performance of method 300, the next determination at block 325 is negative. In other words, following the processing of three indications as described above, no further indications remain to be processed during the installation of application 124. Method 300 then proceeds to block 345.

At block 345 a further request can be received to install a further application 124. Following performance of block 345, method 300 returns to block 310 and the receipt of indications and determination of whether or not corresponding data exists in shared cache 126 can be repeated. It will be understood that performance of block 345 need not take place immediately after performance of block 325. Rather, performance of blocks 325 and 345 can be separated by a wide variety of time periods—two minutes or three years or any time period in between, for instance. The performance of block 345 illustrates that processor 102 can be configured to manage shared cache 126 of mobile electronic device 100 during installation of any of a variety of different applications 124. In some embodiments, the next performance of method 300 resulting from a further installation request can therefore result in no data being added to shared cache 126 (if all the indications received in connection with the further application are representative of data already contained within shared cache 126).

Figure 5:
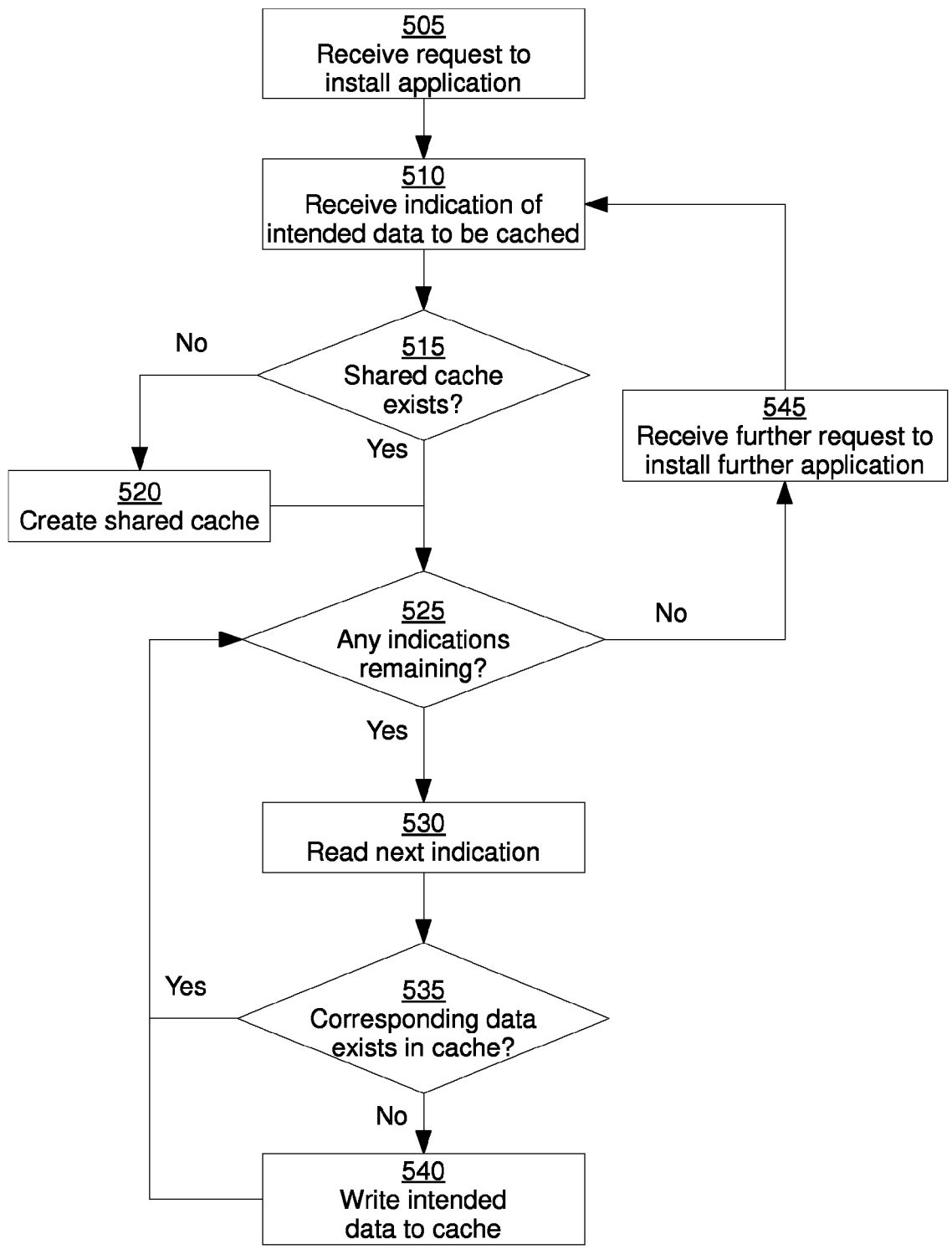
FIG. 5 depicts a method for managing memory in a mobile electronic device, according to a second non-limiting embodiment.

Referring now to FIG. 5, a method 500 for managing memory according to another embodiment is shown. It will be noted that several blocks of method 500 are similar to blocks of method 300. Those blocks are numbered similarly to the corresponding blocks of method 300, with the exception of leading "5" being used rather than a leading "3." Thus, blocks 505, 510, 525, 530, 535, 540 and 545 are as described above in connection with their corresponding blocks of method 300. Method 500 also includes blocks 515 and 520. Performance of block 515 can take place after performance of block 510. At block 515, processor 102 can be configured to determine whether shared cache 126 exists. If the determination is negative, processor 102 can be configured to create shared cache 126, for example by reserving a predetermined amount of storage space in memory 122. Method 500 then proceeds to block 525. If the determination at block 515 is positive, method 500 simply proceeds to block 525.

Figure 6:
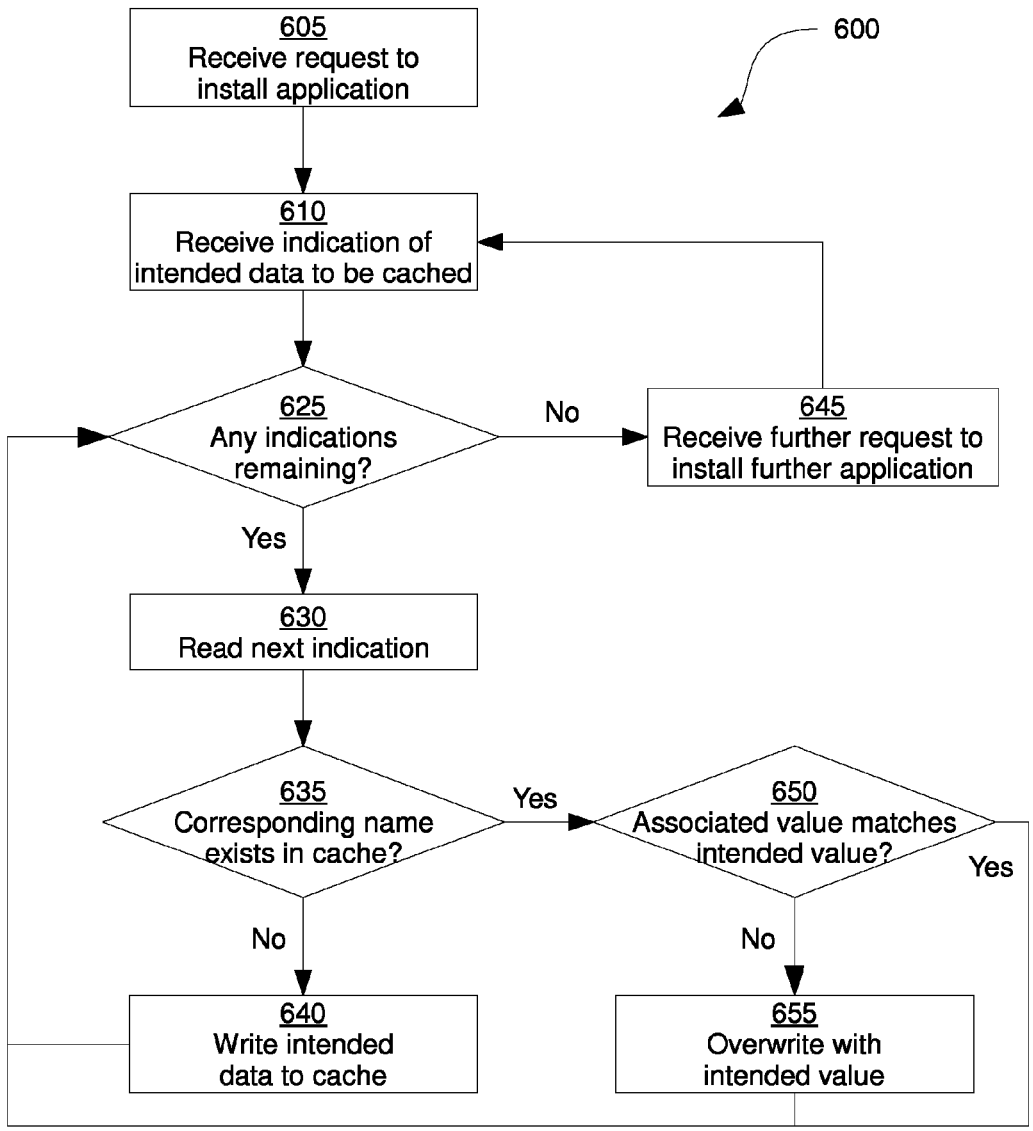
FIG. 6 depicts a method for managing memory in a mobile electronic device, according to a third non-limiting embodiment.

Referring now to FIG. 6, a method 600 for managing memory according to a further embodiment is shown. As with method 500 above, blocks similar to those of methods 300 and are identified with similar numbers (with a leading "6" rather than a "3"). Thus blocks 605, 610, 625, 630, 635, 640 and 645 are as described above in connection with their corresponding blocks in method 300. At block 610, however, the indications received can include both the name and the value of a name-value pair intended to be stored in shared cache 126.

Following an affirmative determination at block 635, rather than return to block 625 method 600 proceeds to block 650. At block 650, processor 102 can be configured to compare the intended value included in the indication with the existing value associated with the corresponding name within shared cache 126. For example, the indication can include the intended name "Sync Contacts" and the intended value "No." Referring briefly to FIG. 4, the determination at block 635 is affirmative as shared cache 126 does contain a corresponding name 202n "Sync Contacts." However, the determination at block 650 is negative, as the associated value 202v ("Yes") does not match the intended value of "No." Method 600 therefore proceeds to block 655, where processor 102 can be configured to overwrite the existing value 202v with the intended value. It will now be apparent that in some embodiments, the overwriting at block 655 can occur after a confirmation or request to overwrite (not shown) is received, for example in the form of input data received at processor 102 from input device 121.

When the determination at block 650 is affirmative, method 600 simply returns to block 625.

It will now be apparent that as data maintained in shared cache 126 can be accessed by processor 102 via execution of any of a variety of applications 124, changes made to shared cache 126 during execution of an application can affect the execution of a different application. For example, data 204 of shared cache 126 can be edited during execution of an application by way of input data received at processor 102 from input device 121. The editing can be, for example, a change of value 204v from "Email" to "Ring." Subsequent execution of another application which configures processor 102 to read value 204v can then be affected in that notifications generated by processor 102 occur as ring-tones rather than emails.

Certain advantages will now occur to those skilled in the art. For example, rather than each one of multiple applications 124 maintained on mobile device 100 creating a separate cache with data for use by processor 102 during execution of that application, data within shared cache 126 can be re-used by processor 102 during execution of different applications. This allows for reduced usage of memory 122 of mobile electronic device 100. Other advantages may also occur to those skilled in the art.

As a further variation, in some embodiments processor 102 can be configured to examine the contents of shared cache 126 (that is, the settings and content stored therein). Processor 102 can further be configured to retrieve and install new (i.e. currently not present on mobile electronic device 100) applications based on the results of the examination. Processor 102 can also be configured to control display module 116 to generate a representation 120 recommending certain new applications to a user of mobile electronic device 100.

Persons skilled in the art will appreciate that there are yet more alternative implementations and modifications possible for implementing the embodiments, and that the above implementations and examples are only illustrations of one or more embodiments. For example, elements of the various methods described herein can be combined. That is, method 300 can include a cache creation step, method 500 can include an overwrite step and so on. The scope, therefore, is only to be limited by the claims appended hereto.

I claim:

1. A method for managing application data in a mobile electronic device, the method comprising:
receiving a request to install a first application;
receiving at least one indication of data for use by the first application and intended to be maintained in a shared cache;
determining, based on the at least one indication, whether data corresponding to the intended data exists in the shared cache;
upon a negative determination, writing the intended data to the shared cache, the intended data accessible by the first application and a second application in the mobile electronic device; and
repeating the receiving at least one indication, the determining and the writing for at least one additional application.

2. The method of claim 1, comprising receiving a plurality of indications of data intended to be maintained in the shared cache; and
for each one of the plurality of indications, determining, based on the one of the plurality of indications, whether data corresponding to the intended data exists in the shared cache; and,
upon a negative determination, writing the intended data to the shared cache.

3. The method of claim 1, further comprising:
prior to repeating the receiving at least one indication, the determining and the writing, receiving a further request to install the at least one additional application.

4. The method of claim 1, further comprising:
prior to determining whether data corresponding to the intended data exists in the shared cache, detecting whether the shared cache exists; and
when the detection is negative, creating the shared cache.

5. The method of claim 4, wherein creating the shared cache comprises reserving a predetermined amount of storage space in a memory of the mobile electronic device.

6. The method of claim 1, wherein the intended data comprises an intended name and an intended value associated with the intended name, wherein the at least one indication comprises the intended name and wherein the determination comprises determining if a name corresponding to the intended name exists in the shared cache.

7. The method of claim 6, wherein the at least one indication comprises the intended name and the intended value, the method comprising:
upon a positive determination that a name corresponding to the intended name exists in the shared cache, assessing whether an associated value corresponding to the intended value is maintained in the shared cache; and
upon a negative assessment, overwriting the value with the intended value in the shared cache.

8. The method of claim 6, further comprising:
prior to overwriting, receiving a request to overwrite the value with the intended value.

9. A mobile electronic device comprising:
a memory for maintaining a shared cache;
a processor interconnected with the memory, the processor configured to receive a request to install a first application; the processor further configured to receive at least one indication of data intended for use by the first application and to be maintained in the shared cache; the processor further configured to determine, based on the at least one indication, whether data corresponding to the intended data exists in the shared cache maintained within the memory; the processor further configured to write, upon a negative determination, the intended data to the shared cache; and to repeat the receiving at least one indication, the determination and the writing for at least one additional application,
wherein the intended data stored in the shared cache is accessible by the first application and a second application in the mobile electronic device.

10. The mobile electronic device of claim 9, the processor being configured to receive a plurality of indications of data intended to be maintained in the shared cache; the processor further being configured to determine, for each one of the plurality of indications, based on the one of the plurality of indications, whether data corresponding to the intended data exists in the shared cache; and, upon a negative determination, to write the intended data to the shared cache.

11. The mobile electronic device of claim 9, the processor being further configured to receive a further request to install the at least one additional application prior to repeating the receiving at least one indication, the determination and the writing.

12. The mobile electronic device of claim 9, the processor being further configured to detect whether the shared cache exists in the memory prior to determining whether data corresponding to the intended data exists in the shared cache; the processor further configured to create the shared cache when the detection is negative.

13. The mobile electronic device of claim 12, the processor further configured to create the shared cache by reserving a predetermined amount of storage space in the memory of the mobile electronic device.

14. The mobile electronic device of claim 9, wherein the intended data comprises an intended name and an intended value associated with the intended name, wherein the at least one indication comprises the intended name; the processor configured to determine if a name corresponding to the intended name exists in the shared cache.

15. The mobile electronic device of claim 14, wherein the at least one indication comprises the intended name and the intended value; the processor being further configured to assess whether an associated value corresponding to the intended value is maintained in the shared cache upon a positive determination that a name corresponding to the intended name exists in the shared cache; the processor being further configured to overwrite the value with the intended value in the shared cache upon a negative assessment.

16. The mobile electronic device of claim 14, the processor being further configured to receive a request to overwrite the value with the intended value prior to overwriting.

17. A computer readable storage medium for storing computer readable instructions for execution by a processor, the computer readable instructions implementing the steps of:

receiving a request to install a first application;

receiving at least one indication of data for use by the first application and intended to be maintained in a shared cache;

determining, based on the at least one indication, whether data corresponding to the intended data exists in the shared cache;

upon a negative determination, writing the intended data to the shared cache, the intended data accessible by the first application and a second application included in a mobile electronic device; and repeating the receiving at least one indication, the determining and the writing for at least one additional application.

* * * * *